(12) United States Patent
Michaelis

(10) Patent No.: US 7,386,100 B2
(45) Date of Patent: Jun. 10, 2008

(54) ARRANGEMENT FOR MAINTAINING MODE SYNCHRONIZATION IN AUTOMATIC TTY-TO-TEXT TRANSLATION SYSTEMS

(75) Inventor: Paul R. Michaelis, Boulder, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 1105 days.

(21) Appl. No.: 10/658,951

(22) Filed: Sep. 9, 2003

(65) Prior Publication Data

US 2005/0054380 A1    Mar. 10, 2005

(51) Int. Cl.
*H04M 11/00* (2006.01)

(52) U.S. Cl. ........................... 379/52; 379/93.15
(58) Field of Classification Search ............ 379/52, 379/93.15
See application file for complete search history.

(56) References Cited

U.S. PATENT DOCUMENTS

| | | | |
|---|---|---|---|
| 5,253,285 A * | 10/1993 | Alheim | 379/52 |
| 5,933,476 A * | 8/1999 | Hansen et al. | 379/52 |
| 6,545,616 B1 * | 4/2003 | Haimi-Cohen | 341/91 |
| 2004/0228325 A1 * | 11/2004 | Hepworth et al. | 370/352 |

* cited by examiner

*Primary Examiner*—Stella Woo
(74) *Attorney, Agent, or Firm*—David Volejnicek

(57) ABSTRACT

Teletype (TTY, also known as Telecommunication Device for the Deaf, or TDD) transmissions are moded. The same sequence of tones may code for a letter or for a figure. When a TTY device is transmitting to a text-based Internet Protocol display device, via a TTY-to-text conversion gateway, the text will not be displayed properly if the TTY device and gateway are out of mode synchronization. To fix the problem, either a signal received from the destination terminal causes the gateway to change its conversion mode from letter to figure or vice versa, or a signal input by the end user or automatically generated by the destination terminal causes the destination terminal to display the other character than the received letter or figure that is coded to the same TTY tone sequence.

22 Claims, 3 Drawing Sheets

ARRANGEMENT FOR MAINTAINING MODE SYNCHRONIZATION IN AUTOMATIC TTY-TO-TEXT TRANSLATION SYSTEMS

FIELD OF INVENTION

This invention relates to telecommunication systems in general, and specifically to arrangements that permit automatic translation between teletype (TTY) signals and text transmission protocols.

BACKGROUND OF THE INVENTION

TTYs (also known as telecommunication devices for the deaf, or TDDs) are the text terminals that people with hearing impairments use in order to communicate over telephone lines. In the United States, the most commonly used TTY communication standard is described by ANSI/TIA/EIA standard 825. It describes a 45.45 Baud frequency-shift-keyed (FSK) modem for use on the public switched telephone network. Important aspects of this standard include:

1. TTYs are silent when not transmitting. Unlike fax machines and computer modems, TTYs have no "handshake" procedure at the start of a call, nor do they have a carrier tone during the call. (Although absence of a carrier tone tends to limit the speed of transmission, it has the advantage of permitting TTY tones, Dual Tone Multi-Frequency signals—also known as DTMF or touch tones—and voice transmissions to be intermixed on the same call.)

2. Operation is "half duplex." In other words, TTY users must take turns transmitting, and typically cannot interrupt each other. If both people try to type at the same time, their TTYs will show no text at all, or will show text that is gibberish. There is no automatic mechanism that lets TTY users know when a character they have typed correctly has been received incorrectly.

3. Each TTY character consists of a sequence of seven individual tones. The first is always a "start tone" at 1800 Hz. This is followed by a series of five tones, at either 1400 or 1800 Hz, which specify the character. The final tone in the sequence is always a "stop tone" at 1400 Hz. The "stop tone" is a border that separates this character from the next. Each of the first six tones is 22 milliseconds in duration. The final "stop tone" may also be 22 milliseconds, but is permitted to be as long as 44 milliseconds. This means that the duration of each TTY character is at least 154 milliseconds, which works out to approximately six and a half characters per second. (The description of this as a 45.45 Baud protocol is based on the number of 22-millisecond tones that can be transmitted in one second, not the number of characters.)

4. The protocol is moded. That is, the same five-bit (five-tone) sequence will code for a letter and for a number or punctuation mark, as shown in Table 1. Illustratively when a TTY is in "letters" mode, the sequence 00001 corresponds to the letter E. By contrast, when a TTY is in "figures" mode, the sequence 0001 corresponds to the digit 3. It should be noted that the mode shifts are likewise specified by five-bit sequences "11011" and "11111," as shown in table 1.

TABLE 1

| Binary Sequence | Letters | Figures |
|---|---|---|
| 00000 | N/A | N/A |
| 00001 | E | 3 |
| 00010 | LF | LF |
| 00011 | A | — |
| 00100 | Space | Space |
| 00101 | S | BELL |
| 00110 | I | 8 |
| 00111 | U | 7 |
| 01000 | CR | CR |
| 01001 | D | $ |
| 01010 | R | 4 |
| 01011 | J | ' |
| 01100 | N | , |
| 01101 | F | ! |
| 01110 | C | : |
| 01111 | K | ( |
| 10000 | T | 5 |
| 10001 | Z | " |
| 10010 | L | ) |
| 10011 | W | 2 |
| 10100 | H | # |
| 10101 | Y | 6 |
| 10110 | P | 0 |
| 10111 | Q | 1 |
| 11000 | O | 9 |
| 11001 | B | ? |
| 11010 | G | & |
| 11011 | Figures Shift | Figures Shift |
| 11100 | M | . |
| 11101 | X | / |
| 11110 | V | ; |
| 11111 | Letters Shift | Letters Shift |

Many of the techniques that are commonly employed by telephone systems to digitize voice signals are able to digitize TTY tones with perfect accuracy. Unfortunately, some techniques that are optimized for low-bit-rate encoding of voice signals tend to distort TTY tones. An example of the former is the ITU standard G.711 encoding (also known as 64 kilobit μ-law Pulse Code Modulation) that is commonly employed in digital telephones. An example of the latter is the Group Systeme Mobile (GSM) encoding used on many wireless telephones.

A problem of a different sort is presented when trying to use a TTY in conjunction with packet-switched systems, such Voice over Internet Protocol (VoIP) telephony networks. These systems transmit audio streams by digitally encoding the audio and then breaking the streams into individual packets. A typical packet contains a 20-millisecond stream of audio, although packets of other lengths may also be employed. Each of these audio packets is tagged with header information, such as an identifier of the audio encoding scheme that was used, a sequence number, and the destination's IP address. The complete packet is then delivered by the originating device to the network, which transports the packet via shared pathways that often contain packets from many different sources, with many different destinations.

Although the destination is specified in the packet header information, the route to the destination is not specified. The ability for each packet to take what is, at that instance, the "best" route to its destination is where VoIP derives a lot of its economic advantage. It is also the reason why TTY-on-VoIP can be unreliable: because packets are free to take different pathways, they cannot be relied upon to arrive at the receiving device before it is their "turn" to be played.

Although these packets often arrive eventually, they are regarded as lost because they did not arrive in time, and must therefore be discarded.

Under most circumstances, the loss of occasional packets is not detectable in voice communication. Although 20-millisecond periods of silence would certainly be noticeable in a voice stream (sounding a bit like static), VoIP telephones employ packet loss concealment algorithms that trick the human ear, typically by mimicking the contents of adjacent packets that have been received. Although these techniques work well with voice, they do not work with TTY tones. If a packet containing a TTY tone is lost, the current generation of VoIP techniques is unable to recover it or rebuild it.

With regard to the percentage of packets that one might expect to lose, it is generally the case that packet loss of 0.2% or less is achievable when the two VoIP endpoints are on the same campus, using communication pathways that are not congested. By contrast, for VoIP calls that originate or terminate "off campus"—in other words, for calls in which there is a wider range of packet routing possibilities—or for VoIP calls that are transported on congested networks, packet loss of 2.0% or higher is typical.

With regard to the impact of packet loss on TTY performance, consider the following illustrative example: assume that the VoIP packet size is 20 milliseconds (a typical value) and that the packet loss rate is 0.5% (a rate generally regarded as excellent for VoIP communication). Keep in mind that an individual TTY text character is at least 154 milliseconds in length, and therefore spans eight packets. This means that, if there is a 0.5% likelihood that any one of those packets is missing, approximately four percent of all TTY characters will lose one of their packets. If any one of the eight packets within a character is lost, that character will not be displayed properly on the receiving device. This is true of the mode shift "characters" as well: the signaled mode shift will not be recognized.

Even though the simple statistical model above would seem to predict a four percent TTY error rate under the described conditions (20-millisecond packet size, 0.5% packet loss rate), the actual error rate would tend to be much higher. This is because, if the lost packet is the one that contained the "stop tone" for that character, subsequent characters, even if transmitted without packet loss, might nevertheless be decoded improperly.

As a point of comparison, a TTY character error rate of more than one percent is generally regarded as unacceptable, chiefly because the transmission of information such as bank balances and credit card numbers becomes unreliable. Using a simple statistical model that is based on a 20-millisecond packet size, and ignoring the additional deleterious effects that result from dropping a "stop tone," the one percent character error rate threshold is exceeded when VoIP packet loss rates exceed approximately 0.12%.

Federal laws, such as Section 255 of the Telecommunications Act of 1996 and Section 508 of the Workforce Investment Act of 1998, require telecommunication systems to retain compatibility with standard TTY devices. Given the problems associated with TTY-on-VoIP transmissions, many manufacturers of VoIP systems are exploring methods by which TTY tones may be translated into a standard non-audio text protocol, such as the ITU standard T.140, for reliable transmission within IP networks. Specifically, under the proposals that have been submitted recently to standards bodies such as the Telecommunication Industry Association, incoming TTY tones that are received by the system via an input audio channel (e.g., via an analog trunk on the PSTN) would be converted to their text equivalents and then transmitted within the IP network via data channels that employ an error-correcting protocol such as TCP/IP. Although this text stream could be reconverted to audio tones at the receiving end, thereby permitting a standard TTY to be used, most of the proposals envision piping the text stream directly to non-TTY endpoints, such as desktop computers that are equipped with T.140-compatible "Instant Messaging" software.

FIG. 1 illustrates the architecture of this prior art. User 102 is communicating via a standard TTY device 104. The tones generated by TTY device 104 are transmitted via connection 106, which may be an analog line or a TTY-compatible digital connection that does not distort the tones. Connection 106 terminates at gateway 108, which decodes the tones and translates them into Internet-compatible text equivalents, using a standard protocol such as T.140. The text is transmitted within the IP network 110 to an IP endpoint 112; illustratively, endpoint 112 may be a desktop computer that is able to decode T.140-encoded text and present it on a display. Text transmissions, which originated with TTY user 102, may then be read by non-TTY user 114.

SUMMARY OF THE INVENTION

I have recognized that a problem, familiar to anyone who has used TTYs extensively, has been overlooked in the existing proposals for the TTY-to-text IP gateways: it is very common for the mode of the transmitting TTY and the receiving TTY to get out of synchronization. For example, the transmitting device may be in "letters" mode while the receiving device is in "figures" mode; the person who is transmitting may believe that he or she is sending text, while what is appearing on the recipient's TTY is a series of digits and punctuation marks. (This problem is documented on a website maintained by the Technology Access Program at Gallaudet University, http://tap.gallaudet.edu/TTY-Basics.htm.) When this occurs, recipients must manually toggle the mode on their TTY; on some TTYs (not all), this may be accomplished by tapping the space bar.

This invention is directed to solving the problem of ensuring mode synchronization between end-user devices such as TTY-information display devices and gateways such as TTY-to-text conversion IP gateways.

According to one aspect of the invention, a method of converting signals (e.g., teletype tones) into text comprises receiving signals from a source, converting some received signals into a change of a current conversion mode (e.g., "letters" mode or "figures" mode), converting other received characters into a first or a second type of characters (e.g., letters or figures) depending on the current conversion mode, transmitting the characters to a destination, and in response to receiving a signal from the destination changing the current conversion mode for converting the signals received from the source.

According to another aspect of the invention, a signal-to-text conversion gateway comprises a receiver that receives signals from a source, a converter that converts some received said signals into a change of a current conversion mode of the converter and converts other received said signals into a first or a second type of characters depending on the current conversion mode of the converter, and a transmitter that transmits the characters to a destination, wherein the converter responds to a signal received from the destination by changing the converter's said current conversion mode for converting the signals received from the source.

According to yet another aspect of the invention, a method of operating an end-user device comprises receiving a first type or a second type of characters from a converter (e.g., a TTY-to-text conversion gateway) that converts first signals into the first or the second type of characters depending on a current conversion mode of the converter, presenting the received characters to a user, and in response to input from the user transmitting a second signal to the converter to change the converter's said current conversion mode for converting the first signals.

According to yet another aspect of the invention, an end-user device comprises a receiver that receives a first type or a second type of characters from a converter that converts first signals into the first or the second type of characters depending on a current conversion mode of the converter, a presenting device that presents the received characters to a user, and a transmitter that responds to input from the user by transmitting a second signal to the converter that causes the converter to change the converter's said current mode for converting the first signals.

According to yet another aspect of the invention, a method of operating an end-user device comprises receiving a first type or a second type of characters, presenting (e.g., displaying) the received characters to a user, converting the received one of the first and the second type of characters into the other of the first and the second type of characters in response to receiving a signal (e.g., a signal indicating that a sequence of the received characters is nonsensical), and presenting the converted characters to the user instead of the received characters.

According to yet another aspect of the invention, an end-user device comprises a receiver that receives a first type or a second type of characters, a presenting device that presents the received characters to a user, and a converter that responds to a signal by converting the received one of the first and the second type of characters into the other of the first and the second type of characters and causes the presenting device to present to the user the converted characters instead of the received characters.

BRIEF DESCRIPTION OF THE DRAWING

These and other features and advantages of the invention will become apparent from the following description of an illustrative embodiment of the invention considered with the drawing, in which.

DETAILED DESCRIPTION

Figure 2:
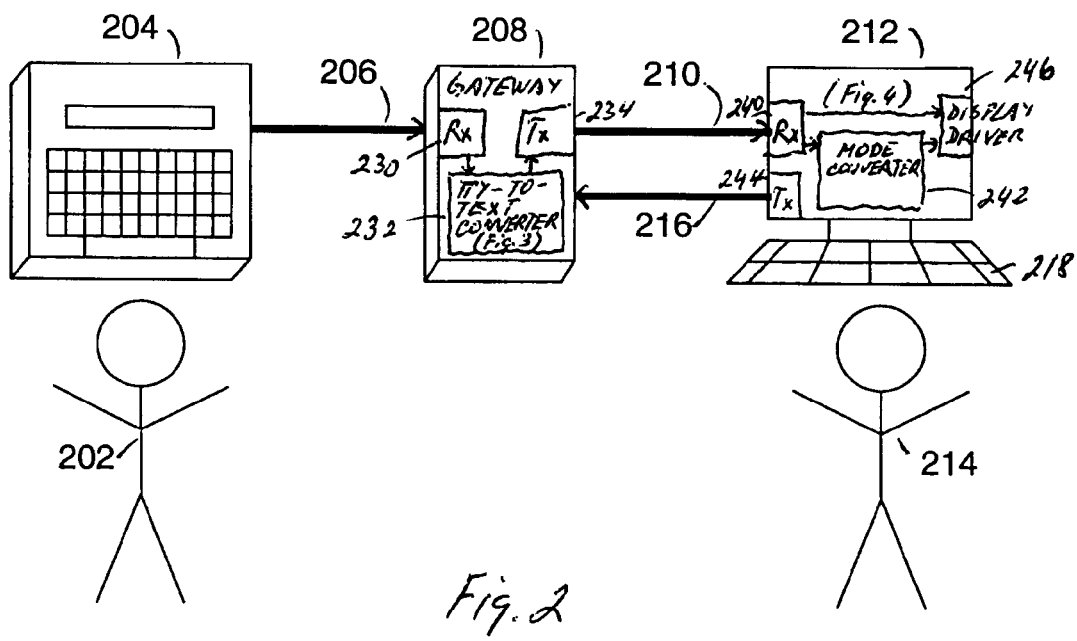
FIG. 2 depicts a VoIP communications system in which the user of an Internet Protocol text-based endpoint may instruct a TTY-to-text Internet Protocol gateway to toggle the encoding mode.
Figure 3:
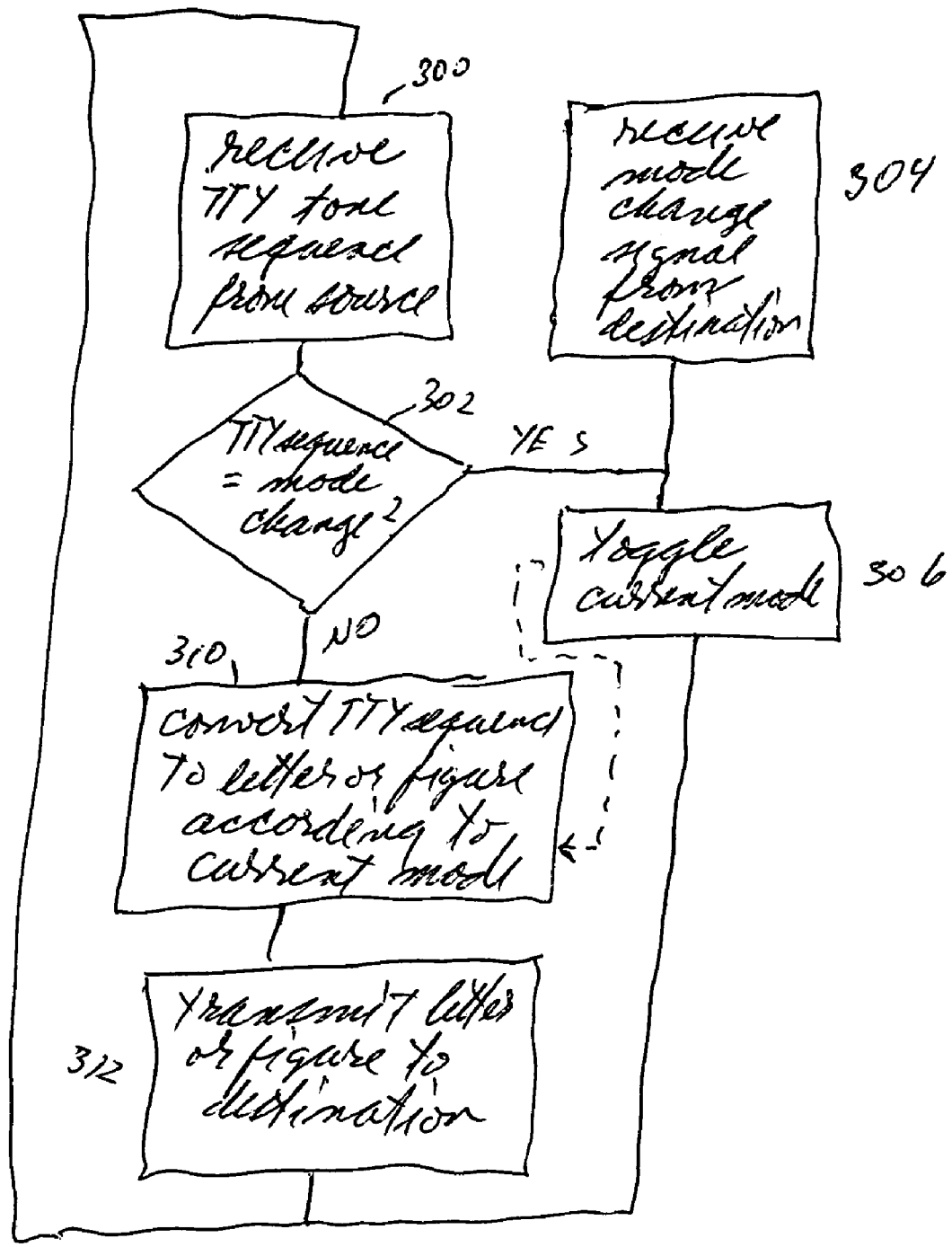
FIG. 3 depicts operation of the gateway of the system of FIG. 2.

Typically, when the user of a standard TTY device observes that incoming text is being displayed in the wrong mode—for example, a random sequence of digits and punctuation marks is being displayed at a time when words were expected—the user must manually toggle the mode of that TTY. FIGS. 2 and 3 depict an arrangement by which the user 214 of an Internet Protocol text-based endpoint 212 may instruct a TTY-to-text Internet Protocol gateway 208 to toggle the encoding mode. (As will be appreciated, a wide variety of devices may be employed as IP endpoints 212, including personal computers, PDAs, and VoIP telephones; these devices may be wired or wireless.)

Figure 1:
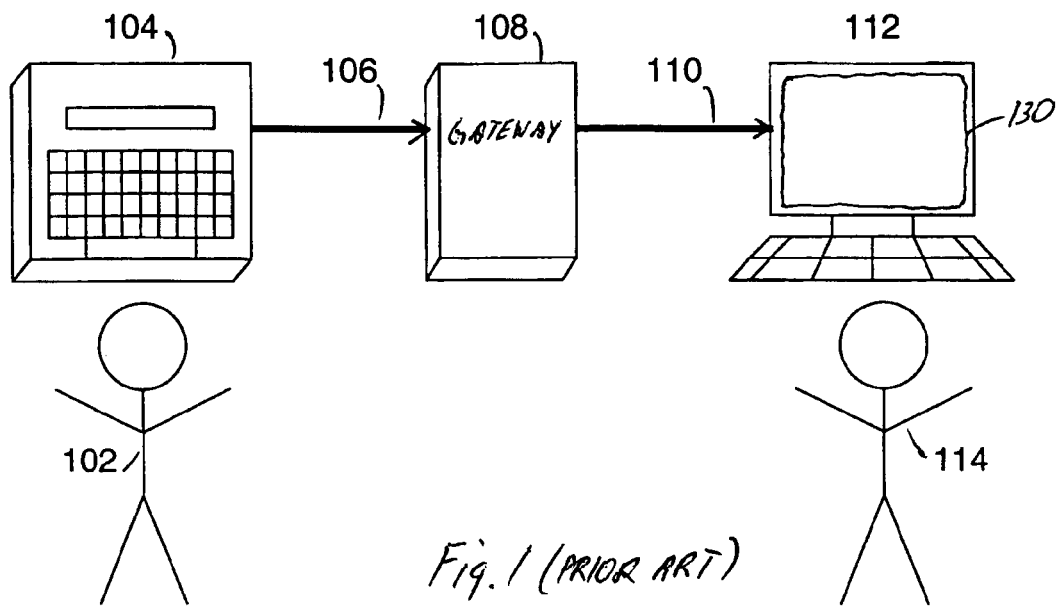
FIG. 1 depicts the prior art for TTY-to-text Internet Protocol gateways.

In FIG. 2, a user 202 is communicating via a standard TTY device 204. The tones generated by TTY device 204 are transmitted via connection 206, which may be an analog line or a TTY-compatible digital connection that does not distort the tones. Connection 206 terminates at a receiver (Rx) 232 of gateway 208 which receives the TTY tone sequence from device 204, at step 300 of FIG. 3. A TTY-to-text converter 232 of gateway 208 checks the received TTY sequence to determine if it signals a mode change, at step 302. If so, converter 232 toggles the current conversion mode, at step 306, and then returns to step 300 to receive the next TTY tone sequence. If the received TTY sequence does not signal a mode change, as determined at step 302, converter 232 decodes the TTY tones and translates them into Internet-compatible text character equivalents, using a standard protocol such as T.140 and the current mode, at step 310. The characters are transmitted by a transmitter (Tx) 234 of gateway 208 within the IP network 210 to an IP endpoint device 212, at step 312. The characters are received by a receiver (Rx) 240 of device 212 and are then displayed on a display (130 in FIG. 1) by a display driver 246. Illustratively, endpoint device 212 may be a desktop computer that is able to decode T.140-encoded text and present it on a display. Text transmissions, which originated with TTY user 202, may then be read by non-TTY user 214. When non-TTY user 214 believes that text is being displayed in the wrong mode on endpoint device 212, (e.g., the user is presented with a nonsensical sequence of characters), user 214 may cause (at step 406 of FIG. 4) a transmitter (Tx) 244 of device 212 to send a signal via control link 216 back to gateway 208 (at step 420 of FIG. 4), instructing it, at step 304 of FIG. 3, to toggle modes (from "figures" mode to "letters" mode or vice versa), at step 306. Illustratively, user 214 might initiate the signal by pressing a specific key or button 218, or a sequence of keys or buttons, on endpoint device 212. Many other techniques that might be employed by users to trigger the mode switch, such as point-and-click computer interfaces or automatic speech recognition, are well known to those skilled in the art.

Figure 4:
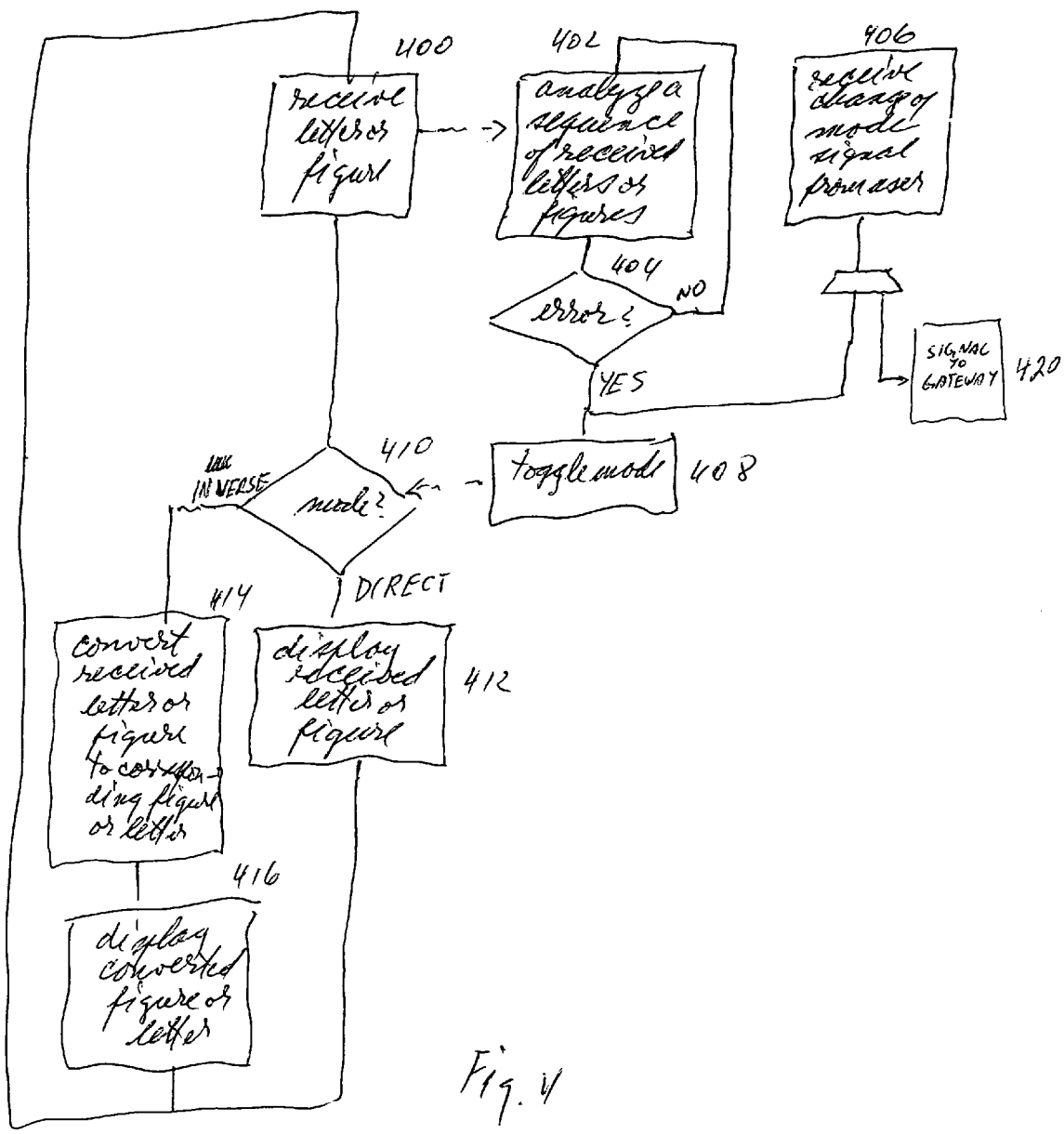
FIG. 4 depicts operation of the endpoint of the system of FIG. 2.

In an alternative embodiment, shown in FIGS. 2 and 4, endpoint device 212 itself converts the text to the correct format when gateway 208 is transmitting in the wrong mode, without assistance from gateway 208, by means of a mode converter 242. As is indicated in TABLE 1, the same five-bit sequence codes for two different characters. Ignoring for now the specific binary sequences that are shown in the left-hand column of TABLE 1, it will be appreciated that the each row of the table shows the specific error that would be expected when gateway 208 is in the wrong mode. Illustratively, when gateway 208 is supposed to be in letters mode, but has instead been shifted to figures mode, the phrase PATENT OFFICE would be received and displayed by endpoint device 212 as 0-53,5 9!!8:3. However, as will be appreciated, it would be a relatively straightforward task for converter 242 to use the data in TABLE 1 to translate the zero into a P, the hyphen into an A, the five into a T, and so on. Specifically, if endpoint device 212 makes the appropriate substitutions—replacing the character in one column with the same-row character in the other column—endpoint device 212 will be able to display text correctly that had been encoded and transmitted incorrectly by gateway 208. Illustratively, user 214 might initiate the use of this translation table by pressing a specific key or button 218, or sequence of keys or buttons, on endpoint device 212, at step 406 of FIG. 4. Alternatively, a trigger that relies on automatic processes may be employed. In one such embodiment, endpoint device 212 shifts automatically to letters, at step 408, mode upon analysis, at step 402, and detection, at step 404, of received character sequences that contain only figures (digits and punctuation marks), such as 0-53,5 9!!8:3. In an enhancement to this embodiment, the letter sequences that correspond to the figures might be analyzed prior to shifting the mode, as a way to confirm that letters, rather than figures, were intended. (Illustratively, the automatic process would not shift the mode until after it confirmed that 0-53,5 9!!8:3 would convert into a plausible text sequence; in this case, the words PATENT OFFICE.) Upon received a character from gateway 208, at step 400, device 212 checks whether its mode is direct or inverse. If direct, device 212 merely displays the received character, at step 412. If inverse, device 212 employs mode converter 242 that uses Table 1 to convert the received letter or figure to the figure or letter, respectively, that codes to the same TTY sequence, at step 414, and then displays the converted character instead of the received character, at step 416.

The architectures disclosed above could be enhanced further by the inclusion of buffer mechanisms. In this alternative embodiment, a buffer—which could be associated with either gateway 208 or endpoint device 212—would store recent transmissions, thereby allowing the transmissions' recovery and corrected redisplay in case they had been displayed originally in the incorrect mode.

Many changes and modifications to the illustrated embodiments would be apparent to those skilled in the art. In particular, it should be noted that the fundamental concepts disclosed herein may be applicable to domains in addition to Internet telephony, such as wireless or cellular communication. Such changes and modifications can be made without departing from the spirit and scope of the invention, and without diminishing its attendant advantages. It is therefore intended that such changes and modifications be covered by the following claims except as limited by prior art.

What is claimed is:

1. A signal-to-text conversion gateway comprising:
a receiver that receives signals from a source;
a converter that converts some received said signals into a change of a current conversion mode of the converter, and converts other received said signals into a first or a second type of characters depending on the current conversion mode of the converter; and
a transmitter that transmits the characters to a destination;
the converter being responsive to a signal received from the destination by changing the converter's said current conversion mode for converting the signals received from the source.

2. The gateway of claim 1 wherein:
the signals received from the source comprise teletype tones;
the first type of characters comprises letters; and
the second type of characters comprises figures.

3. A method of converting signals into text, comprising:
receiving signals from a source;
converting some received signals into a change of a current conversion mode;
converting other received signals into a first or a second type of characters, depending on the current conversion mode;
transmitting the characters to a destination; and
in response to receiving a signal from the destination, changing the current conversion mode for converting the signals received from the source.

4. The method of claim 3 wherein:
the signals received from the source comprise teletype tones;
the first type of characters comprises letters; and
the second type of characters comprises figures.

5. An end-user device comprising:
a receiver that receives a first type or a second type of characters, wherein characters of both of said types are representable by same signals;
a presenting device that presents the received characters to a user; and
a converter that responds to a signal by converting each received character of the received one of the first and the second type of characters into a character of the other of the first and the second type of characters that is representable by the same signals as the received character, and causes the presenting device to present to the user the converted characters instead of the received characters.

6. The end-user device of claim 5 wherein:
the first type of characters comprises letters;
the second type of characters comprises figures; and
the converter converts letters having teletype signal representations into figures having same said teletype signal representations, and vice versa.

7. The end-user device of claim 6 wherein:
the converter receives the signal from the user.

8. The end-user device of claim 7 wherein:
the user generates the signal upon being presented with a nonsensical sequence of characters.

9. The end-user device of claim 6 wherein:
the signal is generated automatically by the end-user device.

10. The end-user device of claim 9 wherein:
the end-user device generates the signal in response to analyzing a sequence of the presented characters and determining that the analyzed character sequence is nonsensical.

11. A method of operating an end-user device comprising:
receiving a first type or a second type of characters, wherein characters of both of said types are representable by same signals;
presenting the received characters to a user;
in response to receiving a signal, converting each received character of the received one of the first and the second type of characters into a character of the other of the first and the second type of characters that is representable by the same signals as the received character; and
presenting the converted characters to the user instead of the received characters.

12. The method of claim 11 wherein:
the first type of characters comprises letters;
the second type of characters comprises figures; and
converting comprises
converting letters having teletype signal representations into figures having same said teletype signal representations, and vice versa.

13. The method of claim 12 wherein:
converting comprises
receiving the signal from the user.

14. The method of claim 13 further comprising:
the user being presented with a nonsensical sequence of characters; and
in response, the user initiating the signal.

15. The method of claim 12 wherein:
converting comprises
the end-user device automatically generating the signal.
16. The method of claim 15 wherein:
generating the signal comprises
the end-user device analyzing a sequence of the received characters; and
in response to determining that the analyzed character sequence is nonsensical, the end-user device generating the signal.
17. An end-user device comprising:
a receiver that receives a first type or a second type of characters that are both representable by same first signals from a signal-to-text conversion gateway that is separate from the end-user device and that converts the first signals into the first or the second type of characters, depending on a current conversion mode of the gateway:
a presenting device that presents the received characters to a user; and
a transmitter that responds to input from the user by transmitting a second signal to the gateway that causes the gateway to change the gateway's said current conversion mode for converting the first signals.
18. The device of claim 17 wherein:
the first signals comprise teletype tones;
the first type of characters comprises letters; and
the second type of characters comprises figures.
19. The device of claim 18 wherein:
the user generates the input in response to being presented with a nonsensical sequence of characters.
20. A method of operating an end-user device comprising:
receiving a first type or a second type of characters that are both representable by same first signals from a signal-to-text conversion gateway that is separate from the end-user device and that converts first signals into the first or the second type of characters, depending on a current conversion mode of the gateway;
presenting the received characters to a user;
in response to input from the user, transmitting a second signal to the gateway that causes the gateway to change the gateway's said current conversion mode for converting the first signals.
21. The method of claim 20 wherein:
the first signals comprise teletype tones;
the first type of characters comprises letters; and
the second type of characters comprises figures.
22. The method of claim 21 further comprising:
the user generating the input in response to being presented with a nonsensical sequence of characters.

* * * * *